B. C. CONVERSE.
Tool for Trimming and Finishing the Edges of Dash-Boards.
No. 203,591. Patented May 14, 1878.
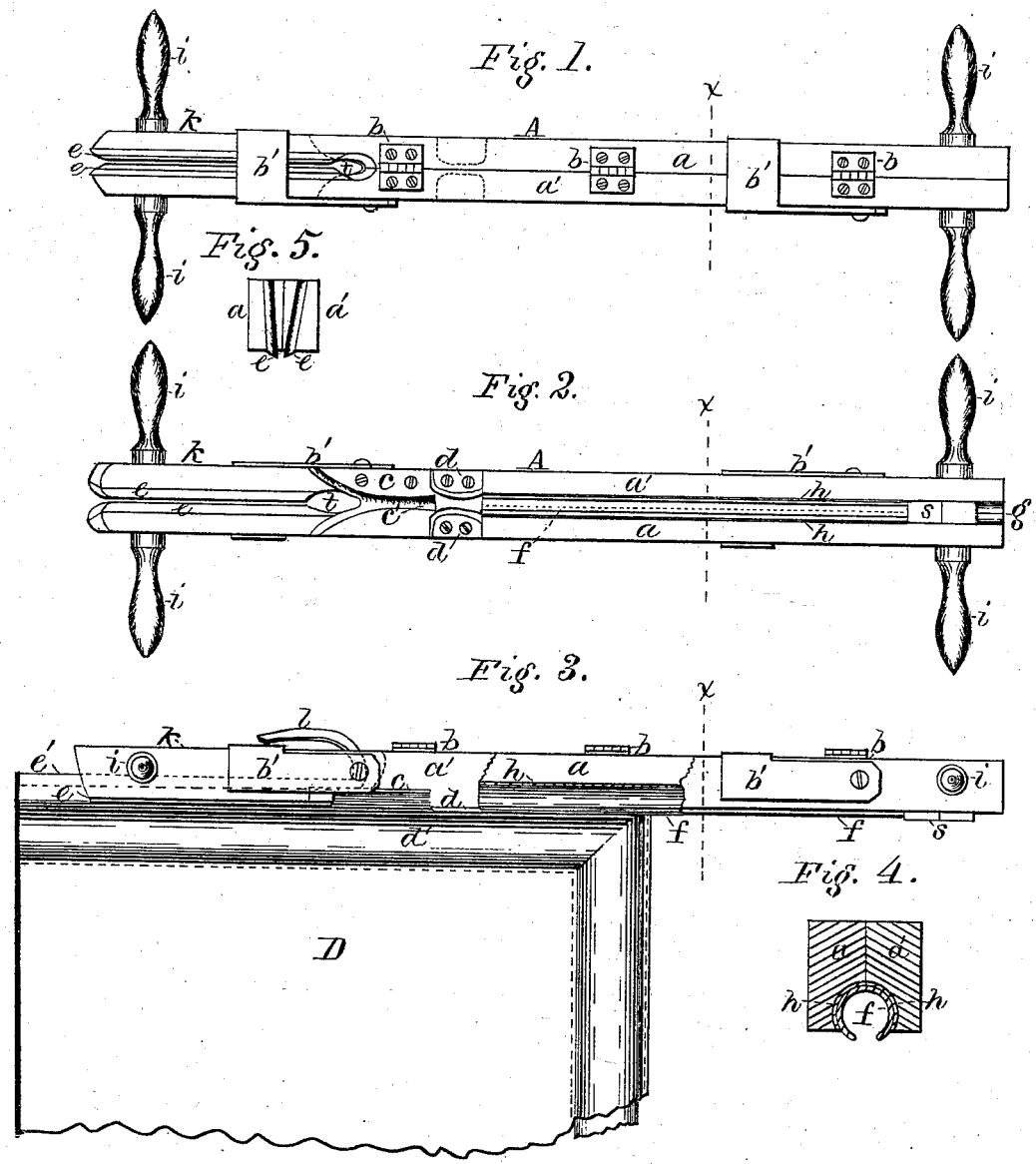

UNITED STATES PATENT OFFICE.

BOLIVAR C. CONVERSE, OF SPRINGFIELD, OHIO.

IMPROVEMENT IN TOOLS FOR TRIMMING AND FINISHING THE EDGES OF DASH-BOARDS.

Specification forming part of Letters Patent No. 203,591, dated May 14, 1878; application filed October 22, 1877.

*To all whom it may concern:*

Be it known that I, BOLIVAR C. CONVERSE, of the city of Springfield, in the county of Clarke and State of Ohio, have invented a new and useful tool for placing the molding upon the dash-boards of vehicles and trimming the edge-leathers at the same time, of which the following is a specification:

This improved tool is fully described and set forth in the following specification, reference being had to the accompanying drawings.

The object of the invention is expressed in the preamble—i. e., to furnish a tool which will accurately trim the top edges of the side leathers of a dash-board and force on the molding or tube-rail used to cover them at the same time.

In the drawings, Figure 1 is a back view of my improved tool for trimming the edge leathers of a dash-board and placing the molding thereon at one operation. Fig. 2 is a view of the under or face side of the same. Fig. 3 shows the tool in operation on a dash-board section. Fig. 4 is a cross-section of the tool and its inclosed molding through line $x$. Fig. 5 is an end view of the front or guide end of the tool.

A is the tool, which is constructed of two long pieces of hard wood, of equal size, dressed so as to form nearly a square in cross-section when united, and hinged together on the back by the hinges $b\ b\ b$, as seen in Figs. 1 and 3. A groove, $g$, nearly two-thirds of a circle in its periphery, is cut out from the face side equally from each section along the dividing-line, for the reception of the piece of molding to be placed. This groove is blocked by a stop, $s$, at the rear end, and extends forward far enough to contain any length of molding required for the dash-board. It is lined with chamois-skin $h$, or its equivalent, to protect the polished surface of the rail or molding $f$, as seen in Figs. 2, 3, and 4. The forward end of the tool is formed into a guide, $k$, by the steel plates $e\ e$. These plates are fastened to the insides of the guide-rails $a\ a'$, and are separated just far enough at their bottom edges to squeeze the edge leathers $e'$ (see Fig. 3) tightly together. The opening between them flares upward at a slight inclination, as seen in Figs. 1, 2, and 5. The latter figure shows their inwardly-rounded ends. This construction is given to the jaws of the guide to allow it to be forced over the edge leathers $e'$ easily, and to prevent the latter from crimping during the operation. This end of the tool is also inclined forward at the top edge, to give ease to the operation of the guide.

At the rear end of the guide $k$ is a throat, $t$, cut through to allow the strips of leather $l$ to escape when cut from the edges of the dash-leathers on dash-board D by the forked knife $c$. (See Fig. 3.) This knife is made of thin flat steel, its forked end drawn to an edge and made sharp, and it is grooved from end to end by groove $c'$ on the under or face side along its middle line, to allow the cut edges of the leather to stand perpendicularly and to guide them in this position into the tube $f$. Its groove $c'$ is slightly deeper at the rear end, to give it clearance. It is fastened securely to one section, $a'$, of the tool, which has a recess cut in it for the purpose, and extends transversely across it at the proper height for cutting the edges of the dash-leathers in advance of the tube or molding $f$ to allow them to enter the same. Immediately behind the knife $c$, on a lower plane, is a pair of creasing-plates, $d\ d$, screwed to the face of the clamp, one on each side thereof, to crease the dash-leathers on each side for the edges of the tube $f$, which follows them in line therewith.

It will be noticed that the edges of the tube $f$ project below the face of the tool A, so that it will readily adjust itself, even if the tool is subjected to any cross-rocking motion, or is not held in a perfectly horizontal position during its operation. Clasp-plates $b'$ are hinged on one side of the tool, and extend down over both sections when closed, holding them firmly together. These plates are L-shaped, something like the ordinary clasps on traveling-bags, though they operate over the reverse or closed edges connected by the hinges of tool A, instead of over the open edges, as in valises, traveling-satchels, &c.

Each end of my trimming and placing tool is provided with a pair of handles, $i\ i$, extending from the sides in horizontal directions for operating it. It is operated by two persons, one at each end. Its operation can be readily understood by reference to Fig. 3, which shows it in operation on the dash-board D. The jaws $e\ e$ of the guide end $k$ are pushed over the edge leathers $e'$, which extend up between them, and are being trimmed by the knife $c$, seen edgewise in the recess in rear of them. As the tool is forced ahead the creasers $d$ crease the leathers close down to the top bar $d'$ of the dash-board, giving the tube or molding $f$, which is seen where a section is broken out of $a'$, a firm seat upon the edge leathers $e'$, and making a smooth and finished job. In Fig. 4 the relative positions of the sections $a\ a'$, the chamois-skin linings $h\ h$, and the inclosed tube or molding $f$ can be seen when A is closed ready for operation.

It is only necessary to raise the clasp-plates $b'$ and open the tool slightly to introduce the molding or tube $f$ in its place, care being taken to place its rear end against the stop $s$.

I claim as my invention—

1. A tool for placing dash-moldings, provided with a groove for inclosing the molding, guide-jaws for compressing and straightening the leather edges of the dash-board, and a knife for trimming said leather edges, as and for the purpose set forth.

2. Tool A, having its sections $a\ a'$, hinged together by hinges $b\ b\ b$, and provided with groove $g$, stop $s$, guide $k$, throat $t$, knife $c$, and creasers $d\ d$, for trimming the edges of the facing-leathers of a dash-board and placing the molding thereon at a single operation.

3. Knife $c$, having groove $c'$, deepened at the rear end to give it clearance, substantially as described, as and for the purpose set forth.

4. In a tool for placing dash-molding, the construction of guide $k$ with plates $e\ e$, set slightly inclined, and provided with forwardly-inclined and inwardly-rounded ends, substantially as set forth.

5. The lining $h\ h$, of chamois-skin or its equivalent, in combination with sections $a\ a'$ and groove $g$, for the protection of the polished surface of the rail or molding while being placed upon the dash-board, as hereinbefore set forth.

6. In a tool for trimming the edge leathers of a dash-board and placing a molding thereon, the sections $a\ a'$, hinged together, as shown, and provided with the clasp-plates $b'$ for holding said sections and the inclosed molding together, and the handles $i\ i$ for operating said tool, as and for the purpose set forth.

BOLIVAR C. CONVERSE.

Attest:
AUSTIN C. EVANS,
A. BRADFORD.